United States Patent [19]

Druliner et al.

[11] Patent Number: 5,059,657

[45] Date of Patent: Oct. 22, 1991

[54] POLYMERIZATION OF SELECTED VINYL MONOMERS

[75] Inventors: Joe D. Druliner, Newark, Del.; Michael Fryd, Morrestown, N.J.

[73] Assignee: E. I. Du Pont de Nemours and Company, Wilmington, Del.

[21] Appl. No.: 562,981

[22] Filed: Aug. 6, 1990

[51] Int. Cl.$^5$ ............................................. C08F 287/00
[52] U.S. Cl. .................................... 525/244; 526/219; 526/204; 526/236; 526/147; 526/262; 526/317.1; 526/328; 526/329.7; 525/242; 525/245; 525/256; 525/260
[58] Field of Search ............... 526/219, 204, 147, 236; 525/260, 256, 244, 245, 242

[56] References Cited

U.S. PATENT DOCUMENTS 2,376,963  5/1945  Garvey ..................... 526/205 NM
2,845,403  7/1958  Gunberg ............................. 525/256

OTHER PUBLICATIONS

Webster (1983), J. Am. Chem. Soc. 103, 5706–5708.

*Primary Examiner*—Joseph L. Schofer
*Assistant Examiner*—M. Nagumo

[57] ABSTRACT

A process for the polymerization of selected acrylic and maleimide monomers by contacting the monomers with a diazotate, cyanate or hyponitrite, and N-chlorosuccinimide, N-bromosuccinimide or a diazonium salt. The polymers produced can themselves initiate further polymerization. Block copolymers can be produced.

34 Claims, No Drawings

POLYMERIZATION OF SELECTED VINYL MONOMERS

FIELD OF THE INVENTION

This invention concerns a process for the polymerization of selected vinyl monomers, by contacting the vinyl monomer with an aryl diazotate, a cyanate, or a hyponitrite, and an aryl diazonium salt or an N-halosuccinimide. The polymers produced are useful for initiating further polymerization. Useful block polymers can also be produced.

BACKGROUND OF THE INVENTION

H. K. Hall Jr. and M. A. Howey, Polym. Bull., vol. 12, pg. 427–431 (1984) report that aryl diazonium salts polymerize p-methoxystyrene in nitrobenzene. No mention is made of cyanates or hyponitrites, or the ability to restart the polymerization.

H. Warson in two papers (Die Makromol. Chem., vol. 105, pg. 228–250 (1967)) reports that aryl diazonium compounds with either bisulfite or hypophosphorous acid will polymerize acrylonitrile.

P. R. Singh, et al., Tet. Lett., vol. 23, pg. 5191–5194 (1982) report the aryl diazonium ions react with nitrite ions to give free radical type intermediates. No mention is made of polymerization.

C. Walling, Free Radical in Solution, John Wiley & Sons, Inc., New York, 1957, pp. 518–519 and W. E. Bachmann and R. A. Hoffman, in R. Adams, Ed., Organic Reactions, Vol. II, John Wiley & Sons, Inc., New York, 1944, pp. 226–230 speculate that aryldiazohydroxides, which are said to be in equilibrium with their sodium salts when in contact with sodium hydroxide, decompose readily at room temperature to give free radicals.

In all of the above references, there is no mention of the use of diazotate, cyanate, hyponitrite "coagents", the use of these compounds for acrylic polymerizations, or the possibility of an "interruptible" polymerization.

U.S. Pat. No. 4,581,429, describes the use of a compound of the formula (here modified) $R^a{}_2N$—O—X, wherein $R^a$ is a hindered alkyl group and X is a group containing at least one carbon atom. Although this compound can initiate acrylic polymerization, and the polymerization is interruptible, no mention is made of diazonium salts, diazotates, cyanates or hyponitrites.

U.S. Pat. No. 4,761,360 describes a light sensitive material containing a silver halide, a reducing agent, a polymerizable compound (vinyl monomer) and a silver diazotate. This mixture is reported to be stable (indeed it is said to be an advantage) until the material is exposed to light, and then heated, at which time the vinyl monomer is polymerized. In the instant process a silver halide is not present.

It is the object of this invention to provide a method for the polymerization of acrylic and maleimide monomers, by contacting the monomers with an aryl diazotate, a cyanate, or a hyponitrite, and an aryl diazonium salt or an N-halosuccinimide. This process, which may be carried out in a variety of ways, such as neat, in solution, or as an emulsion, may be restarted after the polymerization has stopped. This surprising property may be utilized to prepare block copolymers.

SUMMARY OF THE INVENTION

This invention concerns a process for the polymerization of vinyl monomers, comprising, contacting:

(a) an acrylic monomer or N-phenylmaleimide;

(b) a diazotate of the formula $Ar^1$—N=N—O$^-$ M$^+$, or a cyanate of the formula MOCN, or a hyponitrite of the formula $M_2N_2O_2$, wherein $Ar^1$ is aryl or substituted aryl, and M is a metal or a tetrahydrocarbylammonium ion; and (c) N-chlorosuccinimide, N-bromosuccinimide, or a diazonium salt of the formula $Ar^2N_2{}^+$ X$^-$, wherein $Ar^2$ is aryl or substituted aryl, and X is an anion.

DETAILS OF THE INVENTION

Among the vinyl monomers useful in the instant process are acrylic monomers, particularly acrylic acids and esters. By the term acrylic is meant a compound of the formula

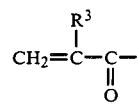

wherein the open valence is attached to a hydrocarbyloxy or substituted hydrocarbyloxy group to form an ester, or a hydroxy group to form an acid. The group $R^3$ is an alkyl group containing up to 4 carbon atoms or hydrogen. Preferred $R^3$ groups are methyl and hydrogen. Preferred acrylic monomers are acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, and 2-hydroxyethyl methacrylate.

By the term "substituted hydrocarbyl(oxy)" herein is meant a hydrocarbyl(oxy) group that contains one or more substituents that do not interfere with the polymerization process. The substituents may be between hydrocarbyl segments, such as ether and amino. Examples of other suitable substituents include, but are not limited to fluoro, keto (oxo), ester, amido, and silyl.

The cyanates, diazotates, and hyponitrites used herein are metal and tetrahydrocarbylammonium salts. By the term "substituted" aryl herein is meant an aryl group that contains one or more substituents that do not interfere with the polymerization process. The substituents may be between hydrocarbyl segments, such as ether and amino. Examples of other suitable substituents include, but are not limited to fluoro, keto (oxo), ester, amide, silyl, alkyl, and cycloalkyl. It is preferred if the aryl group, $Ar^1$, is substituted with one or more electron withdrawing substituents. An electron withdrawing substituent has a so-called Hammett Constant of about 0.2 or more (for a listing of Hammett Constants, see H. Jaffe, Chem. Rev., vol. 53, pg. 222–223 (1953), which is hereby included by reference). Especially preferred substituents are nitro and nitrile. Especially preferred $Ar^1$ groups are p-nitrophenyl, and p-cyanophenyl. Preferred metal ions for the cyanate, diazotate, and hyponitrite salts are alkali metals and tetraalkylammonium and especially preferred are sodium, potassium and tetraalkylammonium.

The diazonium salts used in the instant process have the formula $Ar^2N_2{}^+$ X$^-$, and such diazonium compounds are well known to those skilled in the art. It is preferred if the group $Ar^2$ is derived from benzene, and preferred $Ar^2$ groups are phenyl, and p-nitrophenyl. Preferred anions X are chloride, hexafluorophosphate, hexafluoroantimonate, and tetrafluoroborate.

The process may be run neat (no additional compounds added) or in a solvent, emulsion or suspension. No matter how the reaction is run, it is important that at least some of each ingredient be present in a single phase, at least to start the polymerization. For example, when the process is run neat, ingredients (b) and (c), which are salts, may not be soluble in the neat reaction medium, which normally is mostly vinyl monomer. Thus the salts may be solublized by the addition of small amounts of polar solvents, or so-called crown ethers, which are known to those skilled in the art to solublize ionic compounds in nonpolar solvents. Other well known methods may be used. By a solvent is usually meant a compound that can dissolve the monomer, polymer, and at least a small amount of the (b) and (c) components, although, for example, the solvent may only dissolve small amounts of polymer. Small amounts of compatibilizing compounds, such as methanol, acetone and tetrahydrofuran, may also be useful. The process may be run in emulsion or suspension, preferably aqueous emulsion and aqueous suspension. These various methods are illustrated in the examples.

The process is run at from about $-20°$ C. to about $120°$ C., preferably about $0°$ C. to about $60°$ C., and most preferably about $10°$ C. to about $40°$ C. During rapid polymerization, cooling may be necessary to control the temperature. It is preferred to exclude oxygen, a convenient method to do this is to use an inert atmosphere such as nitrogen. The use of mild agitation is preferred, especially if the ingredients and/or products form more than one phase.

It is possible with this process to prepare block copolymers. By block copolymer is meant ". . . a polymer comprising molecules in which there is a linear arrangement of blocks. A block is defined as a portion of a polymer molecule in which the monomeric units have at least one constitutional or configurational feature absent from adjacent portions. In a block copolymer the distinguishing feature is constitutional, i.e., each of the blocks comprises units derived from a characteristic species of monomer." (Quotation from H. Mark, et. al., Encyclopedia of Polymer Science and Engineering, John Wiley and Sons, New York, 1985, vol. 2, pg. 324.) Block copolymers are produced by sequential addition of monomers. That is, a block is started with one or more monomers. When those monomers are used up (polymerized), a second monomer(s) is added to make the next block. Block polymers are a preferred product of this process.

The polymers made by the process of this invention, even after isolation, as by stripping off solvent under vacuum, or precipitation from a nonsolvent, retain the unusual property of being able to initiate polymerization (herein termed a "secondary polymerization") of one of the selected monomers useful in the instant process. Temperatures needed for this secondary polymerization are about $80°$ C. to about $120°$ C., preferably about $90°$ C. to about $100°$ C. For the secondary polymerization no other ingredients other than the vinyl monomer and polymer are necessary, but it is convenient to mix the vinyl monomer and polymer in solution, so it is preferred to carry out the secondary polymerization in a solvent. If the polymer is soluble in the vinyl monomer, the monomer may act as the solvent, in other words, in this case the secondary polymerization is done neat. Block copolymers may also be made by secondary polymerization. It is preferred if oxygen is excluded from the secondary polymerization.

The polymers produced by the instant process are useful as molding resins, in coatings, and in films. They may be formed into useful articles by processes well known to those skilled in the art.

In the Examples that follow, the following abbreviations are used:
BA - n-butyl acrylate
EHMA - 2-ethylhexyl methacrylate
HEMA - 2-hydroxyethyl methacrylate
MA - methyl acrylate
MAA - methacrylic acid
MMA - methyl methacrylate
Mn - number average molecular weight
Mw - weight average molecular weight
P__- indicates the polymer of the monomer acronym that follows
Ph or $\phi$ - phenyl or phenylene
THF - tetrahydrofuran

EXPERIMENTAL PROCEDURE FOR EXAMPLES 1-26 (TABLE I)

EXAMPLE 1

To a 6 cc glass vial, containing a Teflon ®-coated stir bar, in a $N_2$-filled dry box, was charged: 0.1 m mole $\phi N_2BF_4$, 0.5 cc $N_2$-purged acetone, and 9.4 m mole $N_2$-purged MMA. Then 0.05 mmole $Na_2N_2O_2$ was added, the vial was sealed with a Teflon ®-coated silicon disk, and stirring was started. After stirring for 24 hours, the contents of the vial were combined with 5 cc $CH_2Cl_2$ which was then poured into 20 cc of $0°$ methanol. The precipitated polymer was air dried and a sample was analyzed by GPC, giving $M_W = 32,400$ and $M_N = 16,400$.

Examples 1 through 26 were all carried out essentially identically, except for minor differences noted at the bottom of Table I. Most reactions involved syringe needle sparging with $N_2$ to remove air. The final polymers were analyzed by GPC on total product samples obtained by simply removing volatiles by vacuum (0.1 mm Hg), except for Examples 1 and 4, which involved precipitating the polymers from $CH_2Cl_2$ with methanol.

TABLE I

| Ex. | Component (c), | mmole | Component (b), | mmole | Monomer, | mmole | Co-Solvent | Co-Solv (Vol)/ Monomer (Vol) | Temp. °C. Initiation | Rxn |
|---|---|---|---|---|---|---|---|---|---|---|
| 1 | $PhN_2BF_4$ | 0.10 | $Na_2N_2O_2$ | 0.05 | MMA | 9.4 | $CH_3COCH_3$ | 0.5/1 | 25 | 25 |
| 2 | $PhN_2BF_4$ | 0.10 | $Na_2N_2O_2$ | 0.05 | MMA | 9.4 | $CH_3CN$ | 0.5/1 | 25 | 25 |
| 3 | $PhN_2BF_4$ | 0.10 | $Na_2N_2O_2$ | 0.05 | BA | 5.8 | $CH_3CN$ | 0.5/1 | 25 | 25 |
| 4 | $PhN_2BF_4$ | 0.10 | $Na_2N_2O_2$ | 0.05 | HEMA | 7.2 | $CH_3CN$ | 0.5/1 | 25 | 25 |
| 5 | $PhN_2BF_4$ | 0.10 | $(Bu_4N)_2N_2O_2$ | 0.05 | MMA | 10 | $CH_3CN$ | 0.5/1 | 25 | 25 |
|   |   |   |   |   |   |   |   |   | 40 | 40 |

TABLE I-continued

| Ex. | | | | | | | | | |
|---|---|---|---|---|---|---|---|---|---|
| 6 | PhN$_2$BF$_4$ | 0.10 | Li$_2$N$_2$O$_2$ | 0.05 | MMA | 10 | CH$_3$CN | 0.5/1 | | 25 |
| 7 | PhN$_2$PF$_6$ | 0.30 | Na$_2$N$_2$O$_2$ | 0.15 | MMA | | CH$_3$CN | 0.5/1 | 25 | 40 |
| 8 | p-O$_2$NPhN$_2$BF$_4$ | 0.33 | Na$_2$N$_2$O$_2$ | 0.17 | N-Ph-Maleimide | 6.2 | CH$_3$COCH$_3$ | 5 cc/1.1 g | 40 | 40 |
| 9 | p-O$_2$NPhN$_2$BF$_4$ | 0.25 | Na$_2$N$_2$O$_2$ | 0.13 | MMA | 23 | CH$_3$OH | 0.4/1 | −50 | 0 / 40 |
| 10 | p-O$_2$NPhN$_2$BF$_4$ | 0.50 | Na$_2$N$_2$O$_2$ | 0.25 | MMA | 50 | CH$_3$COCH$_3$ | 0.5/1 | 40 | 40 |
| 11 | p-O$_2$NPhN$_2$BF$_4$ | 0.10 | p-O$_2$NPhN=NONa | 0.10 | MMA | 5.1 | DMF | 1/1 | 30 | 25 |
| 12 | PhN$_2$BF$_4$ | 0.10 | [(CH$_3$)$_4$N)]$_2$N$_2$O$_2$ | 0.10 | MA | 5.0 | CH$_3$OH / Toluene | 0.22/1 / 2.2/1 | −78 | 0 / 25 |
| 13 | p-C$_{10}$H$_{21}$PhN$_2$SbF$_6$ | 0.10 | [(C$_4$H$_9$)$_4$N]$_2$N$_2$O$_2$ | 0.05 | MMA | 3.4 | CH$_3$CN | 1/1 | 25 | 25 |
| 14 | p-C$_{10}$H$_{21}$PhN$_2$SbF$_6$ | 0.04 | [(C$_4$H$_9$)$_4$N]$_2$N$_2$O$_2$ | 0.04 | MA | 1.1 | CH$_3$CN | 2.6/1 | 25 | 25 |
| 15 | p-C$_{10}$H$_{21}$PhN$_2$SbF$_6$ | 0.05 | p-O$_2$NPhN=NONa | 0.05 | MMA | 5.2 | Toluene | 2/1 | 25 | 25 |
| 16 | PhN$_2$BF$_4$ | 0.10 | Na$_2$N$_2$O$_2$ | 0.05 | EHMA | 5.0 | CH$_3$OH | 0.18/1 | 25 | 25 |
| 17 | p-O$_2$NPhN$_2$BF$_4$ | 0.10 | Na$_2$N$_2$O$_2$ | 0.05 | MMA | 10 | H$_2$O | 0.2/1 | 25 | 25 |
| 18 | p-O$_2$NPhN$_2$BF$_4$ | 0.40 | Na$_2$N$_2$O$_2$ | 0.22 | MMA | 4 | H$_2$O$^d$ | 3.5/1 | 25 | 25 |
| 19 | p-O$_2$NPhN$_2$BF$_4$ | 0.40 | Na$_2$N$_2$O$_2$ | 0.22 | MA | 4 | H$_2$O$^d$ | 4.2/1 | 25 | 25 |
| 20 | N-Cl-Succinimide | 0.10 | Na$_2$N$_2$O$_2$ | 0.10 | MMA | 10 | H$_2$O | 0.2/1 | 25 | 25 |
| 21 | N-Cl-Succinimide | 0.05 | p-O$_2$NPhN=NONa | 0.05 | MMA | 5 | H$_2$O | 0.2/1 | 25 | 25 |
| 22 | N-Cl-Succinimide | 0.10 | NaOCN | 0.10 | MMA | 10 | H$_2$O | 0.2/1 | 25 | 25 |
| 23 | N-Cl-Succinimide | 0.10 | NaOCN | 0.10 | MA | 10 | H$_2$O | 0.2/1 | 25 | 25 |
| 24 | p-O$_2$NPhN$_2$BF$_4$ | 0.10 | NaOCN | 0.10 | MMA | 10 | H$_2$O | 0.2/1 | 25 | 25 |
| 25 | PhN$_2$BF$_4$ | 0.13 | NaOCN | 0.13 | MMA | 10 | CH$_3$OH | 0.2/1 | 25 | 25 |
| 26 | p-O$_2$NPhN$_2$BF$_4$ | 0.12 | NaOCN | 0.14 | BA | 10 | H$_2$O$^e$ | 10/1 | 25 | 25 |

| Ex. | Time, hr. | % Conv. | Mn | Mw | Reaction Vessel |
|---|---|---|---|---|---|
| 1 | 24 | — | 16,400 | 32,400 | $a$ |
| 2 | 24 | — | 12,000 | 17,300 | $a$ |
| 3 | 16 | — | 33,500 | 128,000 | $a$ |
| 4 | 16 | solid | | | $a$ |
| 5 | 16 / 2 | — | 17,500 | 34,600 | $a$ |
| 6 | 16 | — | 5,920 | 22,600 | |
| 7 | 0.5 | 10$^W$ | 1,090 | 3,000 | $a$ |
| 8 | 16 | solid | | | $a$ |
| 9 | 5 min. / 0.5 / 4 | — / — / — | 11,400 | 21,100 | $a$ |
| 10 | 2 | — | 11,300 | 20,300 | $b$ |
| 11 | 65 | solid | | | $c$ |
| 12 | 10 min. / 15 min. / 165 min. | — / — / ~100$^N$ | 6,350 | 34,000 | $c$ |
| 13 | 20 | 25$^N$ | | | $c$ |
| 14 | 68 | 78$^N$ | | | $c$ |
| 15 | 4.7 (days) | 29$^N$ | 1,930 | 16,400 | $c$ |
| 16 | 2.3 | 64$^N$ | | | $c$ |
| 17 | 15 | 33$^N$ | 19,400 | 62,800 | $c$ |
| 18 | 17 | 91$^W$ | 8,350 | 39,700 | $c$ |
| 19 | 17 | 61$^W$ | 2,090 | 33,000 | $c$ |
| 20 | 21 | 15$^N$ | | | $c$ |
| 21 | 16 | 28$^N$ | 28,900 | 88,600 | $c$ |
| 22 | 16 | 19$^N$ | 11,800 | 37,900 | $c$ |
| 23 | 16 | 4$^W$ | 2,120 | 6,480 | $c$ |
| 24 | 16 | solid | 32,400 | 523,000 | $c$ |
| 25 | 15 | solid | 85,000 | 463,000 | $c$ |
| 26 | 14 | 73$^W$ | 66,700 | 908,000 | $f$ |

$^a$6 cc glass crimp-cap vial
$^b$125 cc glass filter flask, sealed with rubber septa
$^c$3 cc glass septa-capped vial
$^d$H2O containing 0.05 wt. % lauryl sulfonate
$^e$H2O containing 0.06 wt. % lauryl sulfonate
$^f$30 cc glass crimp-cap vial
$^N$% conversion determined by 1 H NMR
$^W$% conversion determined by weight of vacuum-stripped polymer

EXAMPLE 27

To a 50 cc three-necked glass round-bottomed flask, equipped with a thermometer, Teflon ®-coated stir bar, water-cooled condenser, and N$_2$ inlet and outlet tubes, was charged: 1.98 mmoles φN$_2$BF$_4$, 0.78 mmoles Na$_2$N$_2$O$_2$, and 214 mmoles MMA. The mixture was stirred and purged with N$_2$ using a needle to admit N$_2$ through the liquid for ten minutes. The needle was then changed to the vapor space. At t=0, 10 cc of N$_2$-purged methanol was injected, the pot was heated by means of an electric heating mantle to a liquid temperature of 40° C., and samples of about 1.5 cc each were withdrawn by syringe at the times shown below. Each sample was weighed in a 25 cc filter flask, vacuum stripped to remove volatiles (0.1 mm Hg) and re-weighed. GPC analyses were done for M$_w$ and M$_n$, and % conversion was calculated for each sample.

| Reaction time at 40° (min.) | % Conv. | M$_n$ | M$_w$ |
|---|---|---|---|
| 45 | 17.6 | 2,310 | 6,770 |
| 90 | 24.0 | 3,350 | 10,900 |
| 135 | 31.6 | 4,710 | 12,800 |
| 180 | 43.1 | 5,310 | 14,500 |
| 225 | 41.5 | 4,230 | 15,500 |

EXAMPLE 28

The procedure and techniques described for Example 27 were repeated, except that a 30 cc bottle capped with a metal cap and a Teflon ®-coated silicone disk, was used for the reaction. Rubber tubing, connected to $N_2$ inlet and outlet needles, was used to purge the bottle of air, and a Teflon ®-coated stir bar was used for agitation. The empty bottle was charged with: 0.50 m moles $\phi N_2BF_4$, 0.52 m moles NaOCN, and 50 m moles MMA. The bottle was then capped and $N_2$-purged, then placed in a 35° oil bath. At t+0, 1 cc of $N_2$-purged methanol was injected and samples were withdrawn with time.

| Reaction time at 35° (hr) | % Conv. | $M_n$ | $M_w$ |
|---|---|---|---|
| 1 | 21.7 | 9,230 | 83,800 |
| 2 | 34.7 | 9,900 | 128,000 |
| 3 | 44.4 | 17,400 | 200,000 |

EXAMPLE 29

The procedure described for Example 28, including the use of a 30 cc glass bottle, was repeated as follows, at 25°. The 30 cc bottle was charged with: 0.40 m mole $\phi N_2BF_4$ and 40 m mole MMA. The bottle was sealed, $N_2$ purged, and at t=0, injected with a $N_2$-purged solution of 0.40 m mole $O_2N\phi N{=}NONa$ dissolved in 0.8 cc $H_2O$. Samples were removed by syringe as follows.

| Reaction time at 25° (min.) | % Conv. | $M_n$ | $M_w$ |
|---|---|---|---|
| 30 | 10.5 | 4,590 | 11,400 |
| 60 | 18.3 | 5,880 | 15,600 |
| 90 | 23.6 | 7,320 | 19,000 |
| 120 | 33.2 | 7,920 | 21,600 |
| 150 | 31.6 | 8,180 | 22,300 |
| 180 | 32.2 | 9,040 | 24,600 |

EXAMPLE 30

PMMA Preparation To a 25 cc filter flask, with a Teflon ®-coated stir bar, was charged 0.69 mmole $O_2N\phi N_2BF_4$, 0.24 mmole $Na_2N_2O_2$, and 57.8 mmole MMA. The flask was sealed with a rubber septum and a rubber dropper bulb and was purged with $N_2$ using inlet and outlet needles. At t=0, 2 cc of $N_2$-purged methanol was injected, the flask was heated at 30° and stirred for three hours. The volatiles were then removed by vacuum (0.1 mm Hg) stripping for 15 minutes at 25°. The polymeric product (PMMA) weighed 1.72 g. A 0.52 g portion of the PMMA was placed in a 30 cc crimp cap vial with a stir bar, was sealed with a Teflon ®-coated silicone disk, and was purged with $N_2$. Next, 5 cc of $N_2$-purged BA and 2 cc of $N_2$-purged acetone were injected and the resulting solution was stirred at 30° for 3 hours. A 6.64 g portion of the resulting polymer was stripped of volatiles to give 1.03 g of polymer (PMMA/PBA). The samples of PMMA and PMMA/PBA were characterized by 1H NMR, GPC, and DSC (differential scanning calorimetry).

$^1$H NMR

PMMA Comparison of integrals for peaks at 3.9 ppm

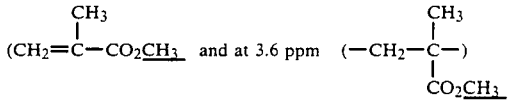

showed that the isolated PMMA contained <7% unreacted MMA.

PMMA/PBA Comparison of integrals at 4.0 ppm

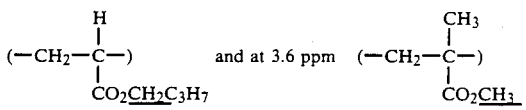

showed that the ratio of PBA/PMMA was 1.1.

| GPC | $M_n$ | $M_w$ |
|---|---|---|
| PMMA | 4,540 | 20,900 |
| PMMA/PBA | 9,880 | 236,000 |

DSC A 0.76 g sample of PMMA/PBA was dissolved in 10 cc THF, filtered, reduced in volume to about 5 cc by vacuum (0.1 mm Hg), then poured into rapidly stirred 30 cc of methanol. The precipitated polymer was collected by filtration and dried at 65° for 16 hours at 15–20 inches of $H_2O$ pressure. The final polymer (PMMA/PBA) weighed 0.63 g. A DSC analysis showed two distinct regions of phase transition; one at −37° (PBA) and one at +122° (PMMA). The two transitions show that the polymer was not a random copolymer, which would be expected to exhibit a single transition temperature midway between −37° and +122°.

EXAMPLE 31

The procedure described for Example 30 was repeated, with the same periods of heating at 30°, except for using the following amounts of reagents: 0.67 mmole $\phi N_2BF_4$, 0.24 m mole $Na_2N_2O_2$, and 52.9 m mole MMA. A 2 cc portion of $N_2$-purged methanol was used in the preparation of PMMA. A 0.42 g sample of PMMA was heated at 30° and stirred with 5 cc of $N_2$-purged BA and 2 cc of $N_2$-purged acetone for 3 hours to prepare the final PMMA/PBA. The PMMA/PBA polymer was characterized by $^1$H NMR and GPC. The comparison of proton integrals for MMA (3.9 ppm) and PMMA (3.6 ppm) in the PMMA polymer showed a MMA/PMMA ratio of about 8/92. The PBA/PMMA ratio in the final polymer was about ¼. The GPC analyses of the polymers gave the following:

| | $M_n$ | $M_w$ |
|---|---|---|
| PMMA | 2,890 | 9,220 |
| PMMA/PBA | 3,900 | 16,300 |

EXAMPLE 32

To a 30 cc glass bottle was charged: 0.40 m mole $\phi N_2BF_4$, 0.40 m mole $Na_2N_2O_2$, and 20 m mole EHMA and a Teflon ®-coated stir bar. The bottle was sealed using a Teflon ®-coated silicone disk and the contents were $N_2$-purged using needles connected to a $N_2$ source and an oil bubbler. At t=0, 0.8 cc of $N_2$-purged methanol was injected by syringe. At t=2 hours, about 1 cc of reaction liquid was removed by syringe for analysis by $^1$H NMR and GPC. At t=2 hours a $N_2$-purged solution of 17.8 m mole MAA in 5 cc of THF was injected and the resulting solution was stirred for an additional 20 hours.

The final polymer was purified by dissolving the reaction product in about 5 cc of THF, followed by pouring into 50 cc methanol. A milky suspension resulted, even on cooling to 0°, so the solvent was allowed to evaporate, by standing in a fume hood for about 16 hours. A 3.54 g sample of tan solid resulted. The tan solid was dissolved in about 5 cc of THF, followed by pouring into 50 cc of heptane. A precipitate was collected by filtration, was air dried, and weighed 2.12 g. The PEHMA and PEHMA//PEHMA/PMAA polymers were analyzed by $^1$H NMR, GPC, and acid titration for PMAA content. Comparison of the $^1$H NMR integral for EHMA, 4.0 ppm

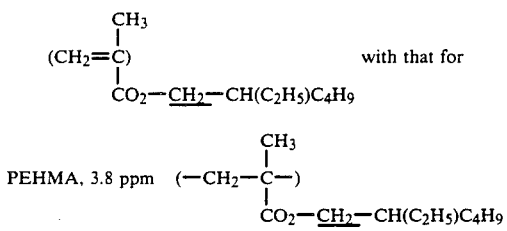

showed a EHMA/PEHMA ratio of 5/3, or 37% conversion of EHMA to PEHMA, in the 2 hour sample. A $^1$H NMR spectrum of the final PEHMA//PEHMA/PMAA polymer showed the presence of only a trace of residual EHMA.

| GPC | $M_n$ | $M_w$ |
|---|---|---|
| PMMA | 3,220 | 18,200 |
| PMMA/PBA | 28,700 | 56,200 |

An acid titration was done to determine the amount of MAA in the final polymer. A 0.146 g portion of the final polymer was dissolved in 5 cc THF and 1 cc methanol, containing a drop of dilute phenolphthalein indicator solution. A total of 0.07 cc of 0.75 N aqueous NaOH solution was required to reach the endpoint. The calculated equivalent weight of the final polymer was 278 g/mole. The calculated ratio of PEHMA total/PMAA in the final polymer was 0.97.

EXAMPLE 33

To a 3 ml glass vial (A), containing Teflon ®-coated magnetic stir bar, was charged 0.0465 g (0.31 mmole) AgOCN, 0.0414 g (0.30 mmole) N-chlorosuccinimide, and 2 ml THF. The vial was sealed with a Teflon ®-coated rubber septum by means of a plastic screw cap and 22 gauge stainless needles were used to pass $N_2$ through the vapor space for about 15 minutes. The contents of the vial were stirred for 30 minutes, then the stirrer stopped to allow solids to settle to the bottom of the vial. A second 3 ml vial (B), containing a Teflon ®-coated magnetic stir bar, was charged with 1.07 ml (10 mmole) MMA and was sealed with a Teflon ®-coated rubber septum and was purged with $N_2$ for about 15 minutes. At t=0, 0.67 ml of the clear liquid phase from vial A was injected into vial B by syringe and the contents were stirred and heated in a 50° oil bath for about 16 hours. The liquid in vial B was then vacuum stripped (0.05 mm) to remove volatiles, giving rise to solid PMMA. A 3 ml glass vial (C), containing a Teflon ®-coated stir bar, was charged with 0.0368 g of PMMA (vial B), 1 ml BA, and 1 ml ethyl acetate. The vial was sealed with a Teflon ®-coated rubber septum, was purged with $N_2$ for about 15 minutes and was stirred and heated at 90° for 70 minutes. The contents of vial C were stripped (0.05 mm) to remove volatiles, giving rise to PMMA/PBA. A $^1$H NMR analysis of the PMMA/PBA showed the presence of PMMA ($CH_3$—O, 3.9 ppm) and PBA ($C_3H_7$—$CH_2$—O—, 4.0 ppm) in a mole ratio of PMMA/PBA=1/9.8. Samples of PMMA (vial B) and PMMA/PBA (vial C) were analyzed by GPC.

| GPC | $M_n$ | $M_w$ |
|---|---|---|
| PMMA | 53,000 | 144,000 |
| PMMA/PBA | 193,000 | 1,050,000 |

The GPC elution curves for both polymers exhibited monomodal behavior. A 0.0274 g sample of PMMA (vial B), was combined with 1 ml of BA and 1 ml of ethyl acetate and was heated under $N_2$ for 20 hours at 45°. A $^1$H NMR analysis of the final solution showed the presence of no significant PBA.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for the polymerization of vinyl monomers, comprising, contacting:
   (a) an acrylic monomer or N-phenylmaleimide;
   (b) a diazotate of the formula $Ar^1$—N=N—O—$M^+$, or a cyanate of the formula MOCN, or a hyponitrite of the formula $M_2N_2O_2$, wherein $Ar^1$ is aryl or substituted aryl, and M is a metal or a tetrahydrocarbylammonium ion; and
   (c) N-chlorosuccinimide, N-bromosuccinimide, or a diazonium salt of the formula $Ar^2N_2^+$ $X^-$, wherein $Ar^2$ is aryl or substituted aryl, and X is an anion.

2. The process as recited in claim 1 wherein said (a) component is a compound of the formula

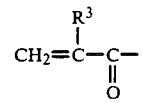

wherein the open valence is attached to a hydrocarbyloxy or substituted hydrocarbyloxy group, or a hydroxy group, and $R^3$ is an alkyl group containing up to 4 carbon atoms or hydrogen.

3. The process as recited in claim 2 wherein said $R^3$ is hydrogen or methyl.

4. The process as recited in claim 3 wherein said (a) component is acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, or 2-hydroxyethyl methacrylate.

5. The process as recited in claim 1 wherein said M is an alkali metal or tetraalkylammonium.

6. The process as recited in claim 1 wherein said $Ar^1$ contains one or more electron withdrawing substituents.

7. The process as recited in claim 1 wherein said $Ar^1$ is p-nitrophenyl or p-cyanophenyl.

8. The process as recited in claim 7 wherein said M is an alkali metal or tetraalkylammonium.

9. The process as recited in claim 1 wherein said $Ar^2$ is derived from benzene.

10. The process as recited in claim 9 wherein said $Ar^2$ is phenyl, or p-nitrophenyl.

11. The process as recited in claim 8 wherein said $Ar^2$ is phenyl or p-nitrophenyl.

12. The process as recited in claim 1 wherein said (b) component is said diazotate.

13. The process as recited in claim 1 wherein said (b) component is said cyanate.

14. The process as recited in claim 1 wherein said (b) component is said hyponitrite.

15. The process as recited in claim 1 wherein said (c) component is said diazonium salt.

16. The process as recited in claim 1 wherein said (c) component is N-chlorosuccinimide or N-bromosuccinimide.

17. The process as recited in claim 1 wherein said X is chloride, hexafluorophosphate, hexafluoroantimonate, or tetrafluoroborate.

18. The process as recited in claim 15 wherein said X is chloride, hexafluorophosphate, hexafluoroantimonate, or tetrafluoroborate.

19. The process as recited in claim 1 wherein the temperature is about $-20°$ C. to about $120°$ C.

20. The process as recited in claim 19 wherein said temperature is about $0°$ C. to about $60°$ C.

21. The process as recited in claim 20 wherein said temperature is about $10°$ C. to about $40°$ C.

22. The process as recited in claim 1 carried out in solution.

23. The process as recited in claim 1 carried out as a suspension.

24. The process as recited in claim 23 wherein said suspension is an aqueous suspension.

25. The process as recited in claim 1 carried out as an emulsion.

26. The process as recited in claim 25 wherein said emulsion is an aqueous emulsion.

27. The process as recited in claim 1 wherein a block copolymer is produced.

28. The process as recited in claim 1, comprising the further step of a secondary polymerization.

29. The process as recited in claim 28 wherein said secondary polymerization is carried out at about $80°$ C. to about $120°$ C.

30. The process as recited in claim 3, comprising the further step of a secondary polymerization.

31. The process as recited in claim 28, wherein the product is a block copolymer.

32. The process as recited in claim 30, wherein the product is a block copolymer.

33. The process as recited in claim 29 wherein said secondary polymerization is carried out at about $90°$ C. to about $100°$ C.

34. The process as recited in claim 5 wherein said M is sodium, potassium or tetraalkylammonium.

* * * * *